(12) United States Patent
Voss

(10) Patent No.: US 10,642,403 B2
(45) Date of Patent: May 5, 2020

(54) METHOD AND APPARATUS FOR CAMERA CONTROL USING A VIRTUAL BUTTON AND GESTURES

(71) Applicant: INTERDIGITAL CE PATENT HOLDINGS, Paris (FR)

(72) Inventor: Neil Voss, Darien, CT (US)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 14/771,316

(22) PCT Filed: Jun. 19, 2013

(86) PCT No.: PCT/US2013/046470
§ 371 (c)(1),
(2) Date: Aug. 28, 2015

(87) PCT Pub. No.: WO2014/137369
PCT Pub. Date: Sep. 12, 2014

(65) Prior Publication Data
US 2016/0004378 A1 Jan. 7, 2016

Related U.S. Application Data

(60) Provisional application No. 61/775,391, filed on Mar. 8, 2013.

(51) Int. Cl.
*H04N 5/225* (2006.01)
*G06F 3/041* (2006.01)
(Continued)

(52) U.S. Cl.
CPC .......... *G06F 3/0416* (2013.01); *G06F 3/0412* (2013.01); *G06F 3/0488* (2013.01);
(Continued)

(58) Field of Classification Search
None
See application file for complete search history.

(56) References Cited

U.S. PATENT DOCUMENTS 6,734,910 B1 * 5/2004 Yumoto ............... H04N 1/2112
348/231.3
2004/0090533 A1 5/2004 Dow et al.
(Continued)

FOREIGN PATENT DOCUMENTS

CN 1249610 4/2000
JP H11177915 A 7/1999
(Continued)

OTHER PUBLICATIONS

Samsung Galaxy S Relay 2013 Samsung.
BlackBerry Q10 Smartphone 2013 BlackBerry.
T-Mobile G2x 2013 Samsung.

*Primary Examiner* — Twyler L Haskins
*Assistant Examiner* — Dwight Alex C Tejano
(74) *Attorney, Agent, or Firm* — Lily Neff

(57) ABSTRACT

A method and apparatus for dynamically controlling a image and video capture device using buttons, virtual buttons, and/or gestures. The system permits the user to control an image capture device by determining through a user command whether to save a captured video as an image or as a video file. For example, holding the capture button beyond a threshold time indicates the capture should be saved as a video, while releasing the capture button before the threshold time indicates the capture should be saved as an image.

7 Claims, 5 Drawing Sheets

(51) Int. Cl.
*H04N 5/232* (2006.01)
*G06F 3/0488* (2013.01)
*H04N 101/00* (2006.01)

(52) U.S. Cl.
CPC ......... *H04N 5/232* (2013.01); *H04N 5/23245* (2013.01); *H04N 5/23293* (2013.01); *G06F 2203/04104* (2013.01); *G06F 2203/04808* (2013.01); *H04N 2101/00* (2013.01)

(56) References Cited

U.S. PATENT DOCUMENTS

| | | |
|---|---|---|
| 2005/0093988 A1 | 5/2005 | Haas et al. |
| 2005/0206771 A1* | 9/2005 | Lin .................... H04N 5/23293 |
| | | 348/333.05 |
| 2006/0119711 A1* | 6/2006 | Ejima .................. H04N 1/2112 |
| | | 348/222.1 |
| 2006/0132636 A1* | 6/2006 | Miyata ................... H04N 5/232 |
| | | 348/333.01 |
| 2008/0079817 A1* | 4/2008 | Murata ................ H04N 1/0044 |
| | | 348/222.1 |
| 2010/0208107 A1 | 8/2010 | Nonaka et al. |
| 2011/0063236 A1 | 3/2011 | Arai et al. |
| 2011/0193982 A1* | 8/2011 | Kook ................ H04N 5/23293 |
| | | 348/222.1 |
| 2013/0064533 A1 | 3/2013 | Nakata |

FOREIGN PATENT DOCUMENTS

| | | |
|---|---|---|
| JP | 2000295568 | 10/2000 |
| JP | 2002077686 A | 3/2002 |
| JP | 2002101331 | 4/2002 |
| JP | 2005143108 A | 6/2005 |
| JP | 2009261024 A | 11/2009 |
| JP | 2010193031 | 9/2010 |
| JP | 2011060209 | 3/2011 |
| JP | 2012151708 A | 8/2012 |
| WO | WO2008038831 | 4/2008 |

\* cited by examiner

METHOD AND APPARATUS FOR CAMERA CONTROL USING A VIRTUAL BUTTON AND GESTURES

This application claims the benefit, under 35 U.S.C. § 365 of International Application PCT/US2013/046470 filed Jun. 19, 2013 which was published in accordance with PCT article 21(2) on Sep. 12, 2014 in English and which claims the benefit of United Provisional application No. 61/775,391 filed Mar. 8, 2013.

BACKGROUND OF THE INVENTION

Portable electronic devices are becoming more ubiquitous. These devices, such as mobile phones, music players, cameras, tablets and the like often contain a combination of devices, thus rendering carrying multiple objects redundant. For example, current touch screen mobile phones, such as the Apple iPhone or Samsung Galaxy android phone contain video and still cameras, global positioning navigation system, internet browser, text and telephone, video and music player, and more. These devices are often enabled an multiple networks, such as wifi, wired, and cellular, such as 3G, to transmit and received data.

The quality of secondary features in portable electronics has been constantly improving. For example, early "camera phones" consisted of low resolution sensors with fixed focus lenses and no flash. Today, many mobile phones include full high definition video capabilities, editing and filtering tools, as well as high definition displays. With this improved capabilities, many users are using these devices as their primary photography devices. Hence, there is a demand for even more improved performance and professional grade embedded photography tools.

For example, many users of mobile devices may use the camera feature in either video or camera mode. While taking a photo image, the user may desire to have taken a video instead. Likewise, a user may begin taking a video but realize that an image may have been more desirable. Often in mobile device camera applications, switching between the two modes is confusing or time consuming. A user may continue using the undesired format because they feature the time required to switch formats may cause them to miss the photo opportunity. Thus, it is desirable to overcome these problems with current cameras embedded in mobile electronic devices.

SUMMARY OF THE INVENTION

A method and apparatus for dynamically controlling a image and video capture device using buttons, virtual buttons, and/or gestures. The system permits the user to control an image capture device by determining through a user command whether to save a captured video as an image or as a video file. For example, holding the capture button beyond a threshold time indicates the capture should be saved as a video, while releasing the capture button before the threshold time indicates the capture should be saved as an image.

In accordance with an aspect of the present invention, a method comprising the steps of receiving a start of a control signal indicating the start of a capture mode, initiating a capture mode in response to said start of said control signal to generate a captured video data, initiating a timer in response to said start of said control signal, receiving an end to said control signal, stopping said timer in response to said end of said control signal to generate an elapsed time, comparing said elapsed time to a threshold time, and saving a portion of said captured video data in response to said elapsed time being less that said threshold time.

In accordance with another aspect of the present invention, a method for capturing an image comprising the steps of displaying an image capture key on a touch screen, generating a control signal in response to an actuation of said image capture key, initiating an image capture mode in response to said control signal, wherein said image capture mode includes starting a timer and saving a video data stream, stopping said timer in response to an end of said control signal to generate an elapsed time, comparing said elapsed time to a threshold time, and saving a portion of said video data stream in response to said elapsed time being less that said threshold time.

In accordance with yet another aspect of the present invention, an apparatus comprising a touch screen for displaying an image capture key and for generating a first control signal in response to an activation of said image capture key and a second control signal in response to a deactivation of said image capture key, a first memory for storing a threshold time, a processor for initiating a capture sequence in response to said first control signal wherein said capture sequence includes saving a video data and for stopping said capture sequence in response to said second control signal, said processor further operative to initiate a timer in response to said first control signal and to stop said timer in response to said second control signal to generate a timer value, wherein said processor is further operative to compare said timer value to said threshold time, wherein a portion of said video data is saved in response to said timer value being shorter than said threshold time, and a second memory for storing said portion of said video data.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DETAILED DESCRIPTION OF THE PREFERRED EMBODIMENT

The exemplifications set out herein illustrate preferred embodiments of the invention, and such exemplifications are not to be construed as limiting the scope of the invention in any manner.

Figure 1:
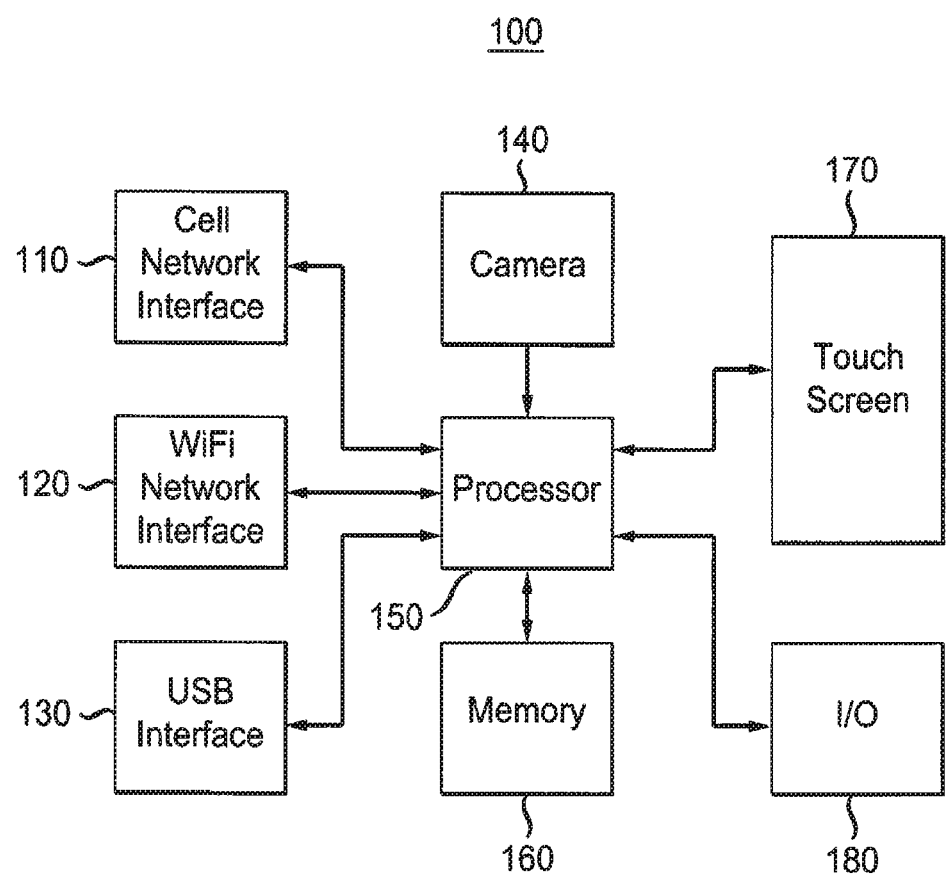
FIG. 1 shows a block diagram of an exemplary embodiment of mobile electronic device.

Referring to FIG. 1, a block diagram of an exemplary embodiment of mobile electronic device is shown. While the depicted mobile electronic device is a mobile phone 100, the invention may equally be implemented on any number of devices, such as music players, cameras, tablets, global positioning navigation systems etc. A mobile phone typically includes the ability to send and receive phone calls and text messages, interface with the Internet either through the cellular network or a local wireless network, take pictures and videos, play back audio and video content, and run applications such as word processing, programs, or video games. Many mobile phones include GPS and also include a touch screen panel as part of the user interface.

The mobile phone includes a main processor 150 that is coupled to each of the other major components. The main processor, or processors, routes the information between the various components, such as the network interfaces, camera 140, touch screen 170, and other input/output I/O interfaces 180. The main processor 150 also processes audio and video content for play back either directly on the device or on an external device through the audio/video interface. The main processor 150 is operative to control the various sub devices, such as the camera 140, touch screen 170, and the USB interface 130. The main processor 150 is further operative to execute subroutines in the mobile phone used to manipulate data similar to a computer. For example, the main processor may be used to manipulate image files after a photo has been taken by the camera function 140. These manipulations may include cropping, compression, color and brightness adjustment, and the like.

The cell network interface 110 is controlled by the main processor 150 and is used to receive and transmit information over a cellular wireless network. This information may be encoded in various formats, such as time division multiple access (TDMA), code division multiple access (CDMA) or Orthogonal frequency-division multiplexing (OFDM). Information is transmitted and received from the device trough a cell network interface 110. The interface may consist of multiple antennas encoders, demodulators and the like used to encode and decode information into the appropriate formats for transmission. The cell network interface 110 may be used to facilitate voice or text transmissions, or transmit and receive information from the internet. This information may include video, audio, and or images.

The wireless network interface 120, or wifi network interface, is used to transmit and receive information over a wifi network. This information can be encoded in various formats according to different wifi standards, such as 802.11g, 802.11b, 802.11ac and the like. The interface may consist of multiple antennas encoders, demodulators and the like used to encode and decode information into the appropriate formats for transmission and decode information for demodulation. The wifi network interface 120 may be used to facilitate voice or text transmissions, or transmit and receive information from the internet. This information may include video, audio, and or images.

The universal serial bus (USB) interface 130 is used to transmit and receive information over a wired like, typically to a computer or other USB enabled device. The USB interface 120 can be used to transmit and receive information, connect to the internet, transmit and receive voice and text calls. Additionally, this wired link may be used to connect the USB enabled device to another network using the mobile devices cell network interace 110 or the wifi network interface 120. The USB interface 120 can be used by the main processor 150 to send and receive configuration information to a computer.

A memory 160, or storage device, may be coupled to the main processor 150. The memory 160 may be used for storing specific information related to operation of the mobile device and needed by the main processor 150. The memory 160 may be used for storing audio, video, photos, or other data stored and retrieved by a user.

Figure 2:
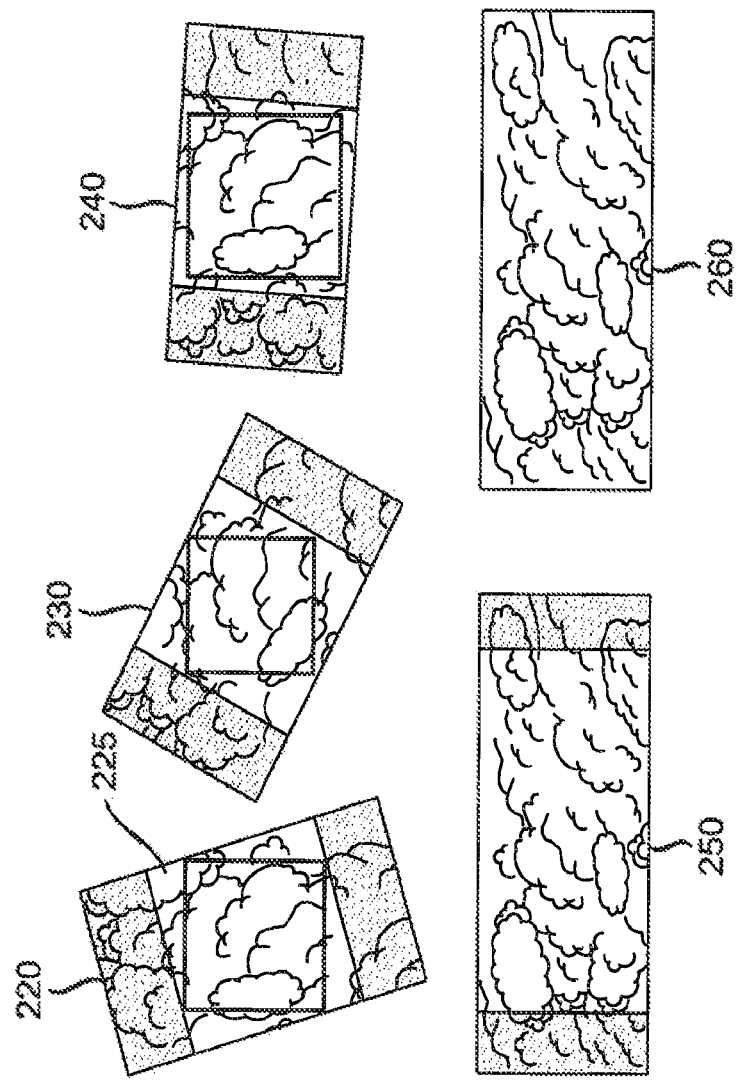
FIG. 2 shows an exemplary mobile device display having an active display according to the present invention.
Figure 2:
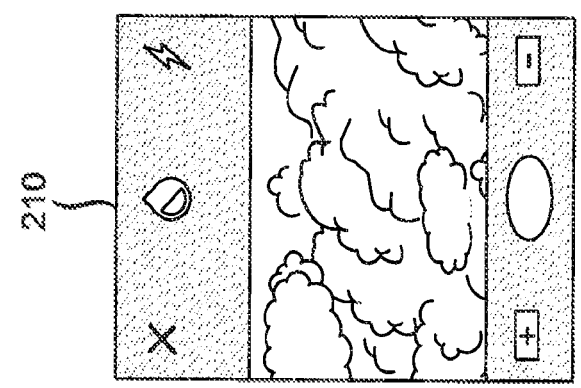

The input output (I/O) interface 180, includes buttons, a speaker/microphone for use with phone calls, audio recording and playback, or voice activation control. The mobile device may include a touch screen 170 coupled to the main processor 150 through a touch screen controller. The touch screen 170 may be either a single touch or multi touch screen using one or more of a capacitive and resistive touch sensor. The smartphone may also include additional user controls such as but not limited to an on/off button, an activation button, volume controls, ringer controls, and a multi-button keypad or keyboard Turning now to FIG. 2 an exemplary mobile device display having an active display 200 according to the present invention is shown. The exemplary mobile device application is operative for allowing a user to record in any framing and freely rotate their device while shooting, visualizing the final output in an overlay on the device's viewfinder during shooting and ultimately correcting for their orientation in the final output.

According to the exemplary embodiment, when a user begins shooting their current orientation is taken into account and the vector of gravity based on the device's sensors is used to register a horizon. For each possible orientation, such as portrait 210, where the device's screen and related optical sensor is taller than wide, or landscape 250, where the device's screen and related optical sensor is wider than tall, an optimal target aspect ratio is chosen. An inset rectangle 225 is inscribed within the overall sensor that is best-fit to the maximum boundaries of the sensor given the desired optimal aspect ratio for the given (current) orientation. The boundaries of the sensor are slightly padded in order to provide 'breathing room' for correction. This inset rectangle 225 is transformed to compensate for rotation 220, 230, 240 by essentially rotating in the inverse of the device's own rotation, which is sampled from the device's integrated gyroscope. The transformed inner rectangle 225 is inscribed optimally inside the maximum available bounds of the overall sensor minus the padding. Depending on the device's current most orientation, the dimensions of the transformed inner rectangle 225 are adjusted to interpolate between the two optimal aspect ratios, relative to the amount of rotation.

For example, if the optimal aspect ratio selected for portrait orientation was square (1:1) and the optimal aspect ratio selected for landscape orientation was wide (16:9), the inscribed rectangle would interpolate optimally between 1:1 and 16:9 as it is rotated from one orientation to another. The inscribed rectangle is sampled and then transformed to fit an optimal output dimension. For example, if the optimal output dimension is 4:3 and the sampled rectangle is 1:1, the sampled rectangle would either be aspect filled (fully filling the 1:1 area optically, cropping data as necessary) or aspect fit (fully fitting inside the 1:1 area optically, blacking out any unused area with 'letter boxing' or 'pillar boxing'. In the end the result is a fixed aspect asset where the content framing adjusts based on the dynamically provided aspect ratio during correction. So for example a 16:9 video comprised of 1:1 to 16:9 content would oscillate between being optically filled 260 (during 16:9 portions) and fit with pillar boxing 250 (during 1:1 portions).

Additional refinements whereby the total aggregate of all movement is considered and weighed into the selection of optimal output aspect ratio are in place. For example, if a user records a video that is 'mostly landscape' with a minority of portrait content, the output format will be a landscape aspect ratio (pillar boxing the portrait segments). If a user records a video that is mostly portrait the opposite applies (the video will be portrait and fill the output optically, cropping any landscape content that falls outside the bounds of the output rectangle).

Figure 3:
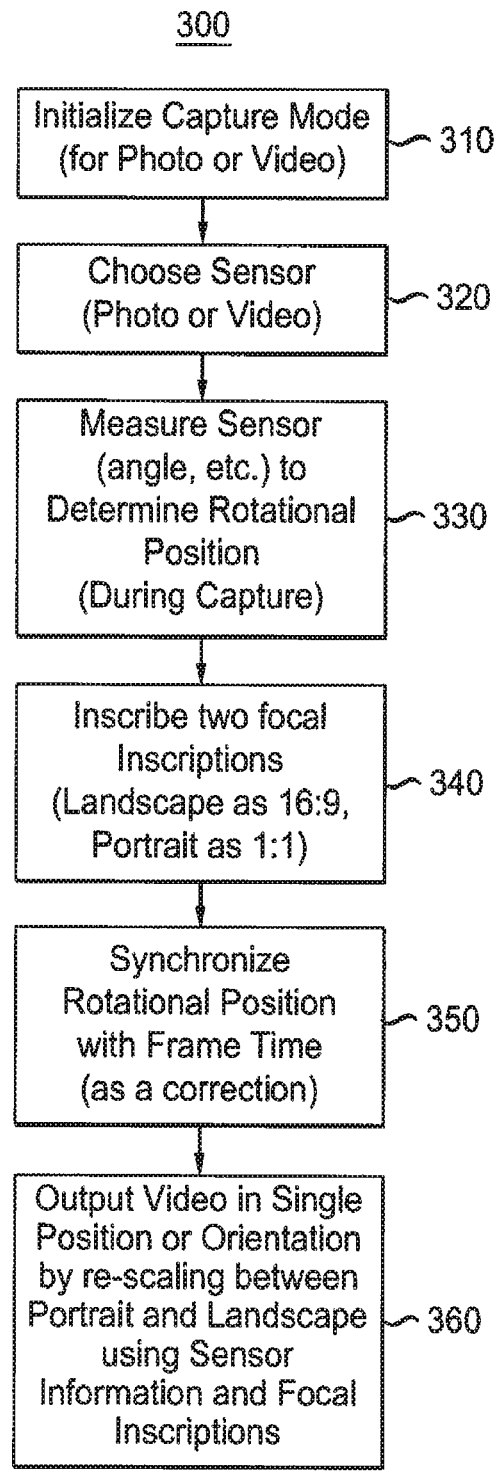
FIG. 3 shows an exemplary process for image stabilization and reframing in accordance with the present disclosure.

Referring now to FIG. 3, an exemplary process for image stabilization and reframing 300 in accordance with the present disclosure is shown. The system is initialized in response to the capture mode of the camera being initiated. This initialization may be initiated according to a hardware or software button, or in response to another control signal generated in response to a user action. Once the capture mode of the device is initiated, the mobile device sensor 320 is chosen in response to user selections. User selections may be made through a setting on the touch screen device, through a menu system, or in response to how the button is actuated. For example, a button that is pushed once may select a photo sensor, while a button that is held down continuously may indicate a video sensor. Additionally, holding a button for a predetermined time, such as 3 seconds, may indicate that a video has been selected and video recording on the mobile device will continue until the button is actuated a second time.

Once the appropriate capture sensor is selected, the system then requests a measurement from a rotational sensor 320. The rotational sensor may be a gyroscope, accelerometer, axis orientation sensor, light sensor or the like, which is used to determine a horizontal and/or vertical indication of the position of the mobile device. The measurement sensor may send periodic measurements to the controlling processor thereby continuously indicating the vertical and/or horizontal orientation of the mobile device. Thus, as the device is rotated, the controlling processor can continuously update the display and save the video or image in a way which has a continuous consistent horizon.

After the rotational sensor has returned an indication of the vertical and/or horizontal orientation of the mobile device, the mobile device depicts an inset rectangle on the display indicating the captured orientation of the video or image 340. As the mobile device is rotated, the system processor continuously synchronizes inset rectangle with the rotational measurement received from the rotational sensor 350. They user may optionally indicate a preferred final video or image ration, such as 1:1, 9:16, 16:9, or any ratio decided by the user. The system may also store user selections for different ratios according to orientation of the mobile device. For example, the user may indicate a 1:1 ratio for video recorded in the vertical orientation, but a 16:9 ratio for video recorded in the horizontal orientation. In this instance, the system may continuously or incrementally rescale video 360 as the mobile device is rotated. Thus a video may start out with a 1:1 orientation, but could gradually be rescaled to end in a 16:9 orientation in response to a user rotating from a vertical to horizontal orientation while filming. Optionally, a user may indicate that the beginning or ending orientation determines the final ratio of the video.

Figure 4:
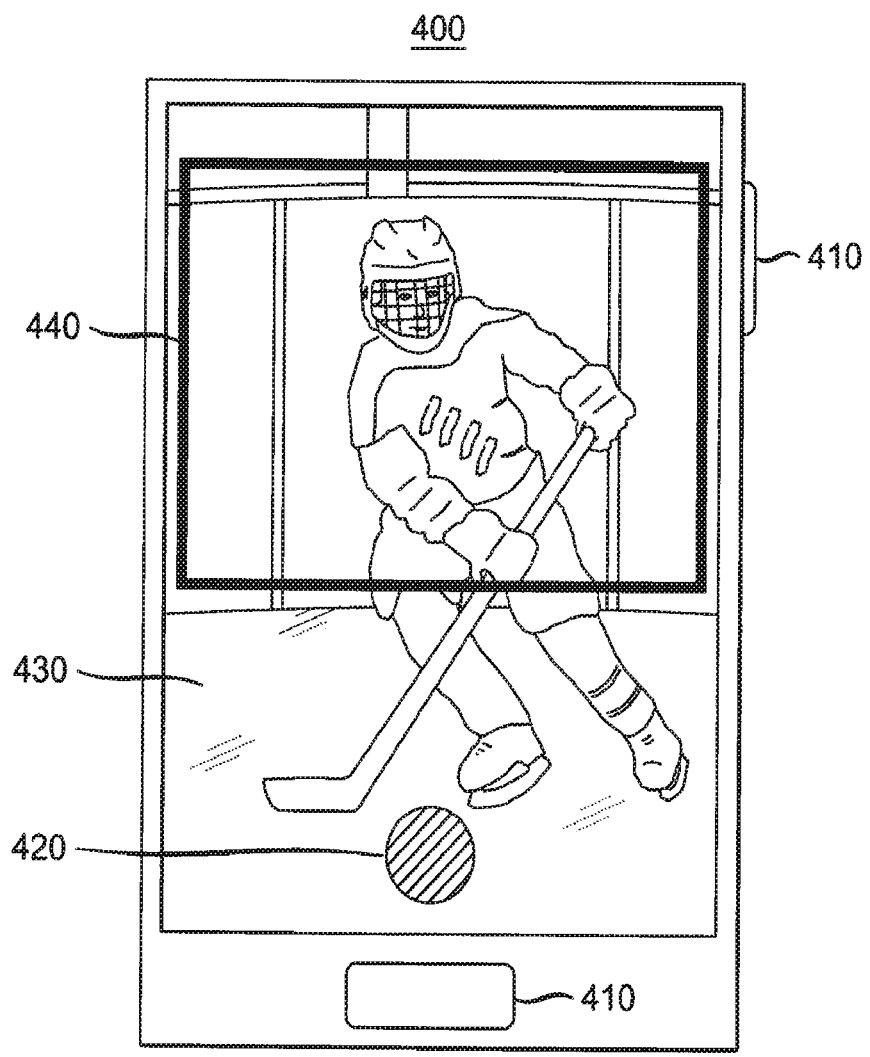
FIG. 4 shows an exemplary mobile device display having a capture initialization 400 according to the present invention.

Turning now to FIG. 4, an exemplary mobile device display having a capture initialization 400 according to the present invention is shown. An exemplary mobile device is show depicting a touch tone display for capturing images or video. According to an aspect of the present invention, the capture mode of the exemplary device may be initiated in response to a number of actions. Any of hardware buttons 410 of the mobile device may be depressed to initiate the capture sequence. Alternatively, a software button 420 may be activated through the touch screen to initiate the capture sequence. The software button 420 may be overlaid on the image 430 displayed on the touch screen. The image 430 acts as a viewfinder indicating the current image being captured by the image sensor. An inscribed rectangle 440 as described previous may also be overlaid on the image to indicate an aspect ratio of the image or video be captured.

The capture sequence may be activated by pushing and holding a button, such as a software button or hardware button, and deactivated by releasing the button. Alternatively, the capture sequence may be activated by pushing a button once and then deactivated by pushing the button a second time. The video recording mode may be initiated without regard to the timer through different gesture, without regard to the timer. This different gesture might include double tapping the button, holding the button and swiping to one side, or the like.

Figure 5:
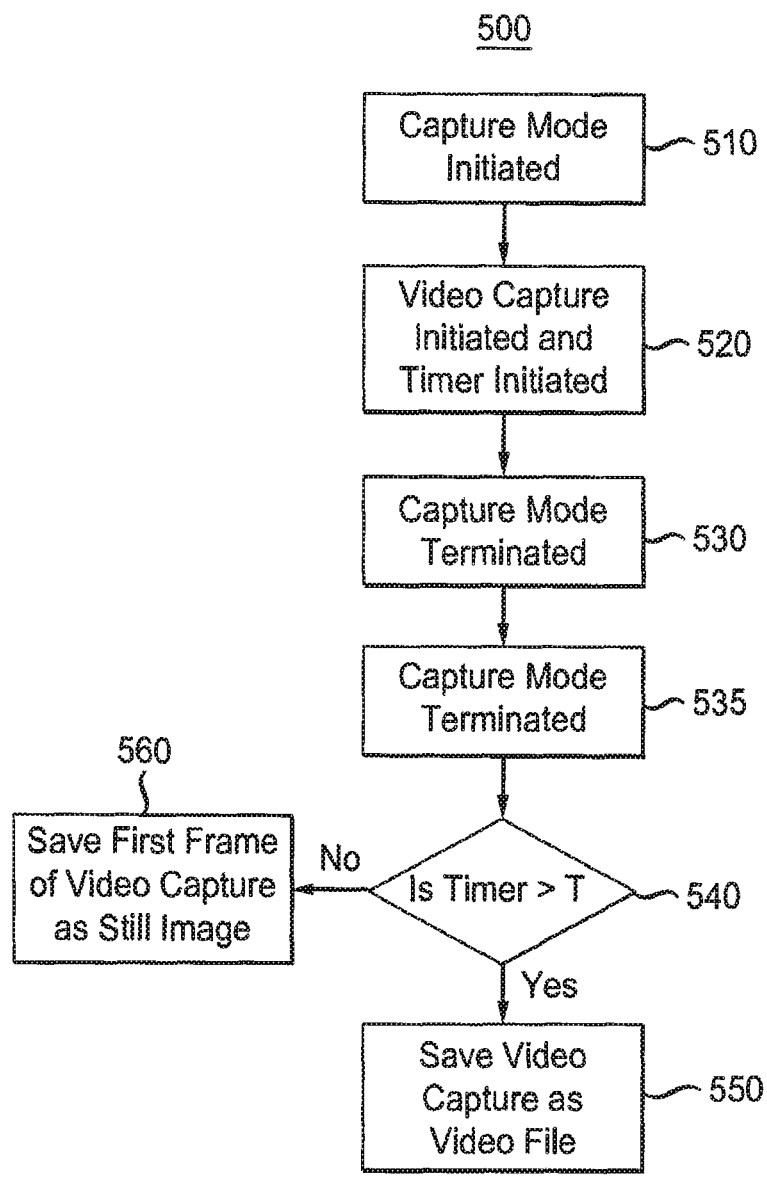
FIG. 5 shows an exemplary process for initiating an image or video capture 500 in accordance with the present disclosure.

Referring now to FIG. 5, an exemplary process for initiating an image or video capture 500 in accordance with the present disclosure is shown. Once the imaging software has been initiated, the system waits for an indication to initiate image capture. Once the image capture indication has been received by the main processor 510, the device begins to save the data sent from the image sensor 520. In addition, the system initiates a timer. The system then continues to capture data from the image sensor as video data. In response to a second indication from the capture indication, indicating that capture has been ceased 530, the system stops saving data from the image sensor and stops the timer.

The system then compares the timer value to a predetermined time threshold 540. The predetermined time threshold may be a default value determined by the software provider, such as 1 second for example, or it may be a configurable setting determined by a user. If the timer value is less than the predetermined threshold 540, the system determines that a still image was desired and saves the first frame of the video capture as a still image in a still image format, such as JPEG or the like 560. The system may optionally choose another frame as the still image. If the timer value is greater than the predetermined threshold 540, the system determines that a video capture was desired. The system then saves the capture data as a video file in a video file format, such as mpeg or the like 550. The system then may then return to the initialization mode, waiting for the capture mode to be initiated again. If the mobile device is equipped with different sensors for still image capture and video capture, the system may optionally save a still image from the still image sensor and start saving capture data from the video image sensor. When the timer value is compared to the predetermined time threshold, the desired data is saved, while the unwanted data is not saved. For example, if the timer value exceeds the threshold time value, the video data is saved and the image data is discarded.

It should be understood that the elements shown and discussed above, may be implemented in various forms of hardware, software or combinations thereof. Preferably, these elements are implemented in a combination of hardware and software on one or more appropriately programmed general-purpose devices, which may include a processor, memory and input/output interfaces. The present description illustrates the principles of the present disclosure. It will thus be appreciated that those skilled in the art will be able to devise various arrangements that, although not explicitly described or shown herein, embody the principles of the disclosure and are included within its scope. All examples and conditional language recited herein are intended for informational purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that the block diagrams presented herewith represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The invention claimed is:

1. A method comprising the steps of:
receiving a start of a control signal indicating the start of a capture mode generated in response to the activation of a capture key;
initiating a capture mode in response to said start of said control signal to capture a content and starting a timer once said content capture commences;
generating a rotational sensor measurement to determine positional disposition of said content at time of capture;
upon receiving an end to said control signal, ending said capture and stopping said timer;
determining if said time between said start and end of capture was greater than a certain amount;
storing said captured content as a video stream in a video file based on duration of elapsed time when said elapsed time is longer than a first time duration amount, and saving said captured content in an image file when said elapsed time is shorter than said first time duration amount; and
adjusting said positional disposition accordingly as to whether said captured content is being saved as said image file or said video stream.

2. The method of claim 1 wherein capture key is an image said capture key and said end of said control signal is generated in response to the release of said image capture key.

3. The method of claim 2 wherein said image capture key is displayed on a touch screen.

4. The method of claim 1 wherein said capture mode is stopped in response to said end of said control signal.

5. An apparatus comprising:
an image sensor for generating a video data stream;
a touch screen for receiving a user input and generating a control signal in response to said user input; wherein said start of said control signal is generated in response to the activation of an image capture key displayed on said touch screen;
a memory for storing at least a portion of said video data stream;
a sensor for generating a rotational sensor measurement to determine positional disposition of said camera
a processor for initiating a timer and for saving said video data stream in response to said control signal, said processor further operative to stop said timer in response to a change in said control signal to generate a time value, said processor further operative to save a portion of said video data stream to said memory in response to said time value being less than a first duration; said processor saving first frame of said video as a still image when said timer value is less than said duration wherein said video data stream is saved as a video file in response to said time value being greater than said duration.

6. The apparatus of claim 5 said change in said control signal is generated in response to the release of said image capture key.

7. The apparatus of claim 5 wherein said saving of said video data stream is stopped in response to said change in said control signal.

* * * * *